(12) United States Patent
Chen

(10) Patent No.: US 12,117,153 B2
(45) Date of Patent: Oct. 15, 2024

(54) INFLATABLE LAMP

(71) Applicant: ZTARX CORPORATION LIMITED, Shenzhen (CN)

(72) Inventor: Songping Chen, Shenzhen (CN)

(73) Assignee: ZTARX CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/429,540

(22) Filed: Feb. 1, 2024

(65) Prior Publication Data

US 2024/0167660 A1 May 23, 2024

Related U.S. Application Data

(63) Continuation of application No. PCT/CN2022/136916, filed on Dec. 6, 2022.

(30) Foreign Application Priority Data

Mar. 28, 2022 (CN) .......................... 202220709839.2

(51) Int. Cl.
*F21V 3/02* (2006.01)
*A63H 27/10* (2006.01)
(Continued)

(52) U.S. Cl.
CPC ................ *F21V 3/026* (2013.01); *F21S 4/20* (2016.01); *F21S 4/24* (2016.01); *F21S 9/035* (2013.01); *F21S 9/037* (2013.01); *F21V 3/023* (2013.01); *F21V 23/008* (2013.01); *F21V 23/009* (2013.01); *F21V 31/005* (2013.01);
(Continued)

(58) Field of Classification Search
CPC .... F21V 3/026; F21S 4/24; F21S 4/22; F21Y 2103/10; A63H 2027/1058
See application file for complete search history.

(56) References Cited

U.S. PATENT DOCUMENTS

2008/0291681 A1* 11/2008 Appleton ................ F21V 3/026
362/307
2013/0187569 A1* 7/2013 Chin-Huan ......... F21V 23/0492
315/307
(Continued)

FOREIGN PATENT DOCUMENTS

CN 201434223 Y 3/2010
CN 202938246 U 5/2013
(Continued)

OTHER PUBLICATIONS

International Search Report issued in corresponding International application No. PCT/CN2022/136916, mailed Jan. 28, 2023.
(Continued)

*Primary Examiner* — William N Harris
(74) *Attorney, Agent, or Firm* — Daniel M. Cohn; Howard M. Cohn

(57) ABSTRACT

An inflatable lamp is provided. The inflatable lamp includes a flexible housing and a light strip, the flexible housing defines a receiving cavity, the receiving cavity is inflatable; the light strip is received in the receiving cavity, at least a portion of the light strip is flexible and attached on an inner side of the flexible housing. The inflatable lamp is easy to carry and store.

18 Claims, 14 Drawing Sheets

(51) Int. Cl.
*F21S 4/20* (2016.01)
*F21S 4/24* (2016.01)
*F21S 9/03* (2006.01)
*F21V 21/08* (2006.01)
*F21V 23/00* (2015.01)
*F21V 31/00* (2006.01)
*F21Y 103/10* (2016.01)
*F21Y 115/10* (2016.01)
*F21V 21/096* (2006.01)

(52) U.S. Cl.
CPC ...... *A63H 2027/1058* (2013.01); *F21V 21/08* (2013.01); *F21V 21/096* (2013.01); *F21Y 2103/10* (2016.08); *F21Y 2115/10* (2016.08)

(56) References Cited

U.S. PATENT DOCUMENTS

| | | | |
|---|---|---|---|
| 2014/0118997 A1* | 5/2014 | Snyder | F21S 9/037 362/183 |
| 2015/0219294 A1 | 8/2015 | Sreshta et al. | |
| 2017/0067268 A1* | 3/2017 | Tong | E04H 4/0025 |
| 2019/0120477 A1* | 4/2019 | Yan | F21V 31/005 |
| 2024/0115907 A1* | 4/2024 | Wolfinbarger | A63B 43/06 |

FOREIGN PATENT DOCUMENTS

| | | | |
|---|---|---|---|
| CN | 203453797 U | 2/2014 | |
| CN | 103968262 A | 8/2014 | |
| CN | 203771075 U | 8/2014 | |
| CN | 203880424 U | 10/2014 | |
| CN | 104508350 A | 4/2015 | |
| CN | 104806896 A | 7/2015 | |
| CN | 205372184 U | 7/2016 | |
| CN | 214580589 U | 11/2021 | |
| CN | 307154068 S | 3/2022 | |
| CN | 217178337 U | 8/2022 | |
| DE | 102016003852 A1 | 9/2017 | |
| DE | 202021105984 U1 | 1/2022 | |
| GB | 2318409 A * | 4/1998 | ............. A63H 27/10 |
| WO | 2017162785 A1 | 9/2017 | |

OTHER PUBLICATIONS

Written Opinion of the International Search Authority in corresponding International application No. PCT/CN2022/136916, mailed Jan. 28, 2023.

* cited by examiner

INFLATABLE LAMP

FIELD OF THE DISCLOSURE

The present disclosure relates to the field of lamps, and in particular to an inflatable lamp.

BACKGROUND OF THE DISCLOSURE

There are various lamps currently on the market, but these lamps are not suitable for outdoor activities. Some lamps cannot be folded for storage and carriage; some lamps are too small in size, resulting in a poor light diffusion and a small illumination area; some lamps are not waterproof and cannot float on the water surface. Further, the existing inflatable lamps are designed to have a certain small size for carry, and the LED light sources in the existing inflatable lamps are rigid lamp panels. In order to expand the illumination area, the rigid lamp panels should be enlarged, which may cause the inflatable lamps are not convenient to carry.

SUMMARY OF THE DISCLOSURE

In view of the foregoing disadvantages inherent in the existing art, the general purpose of the present disclosure is to provide an inflatable lamp, to include all advantages of the existing art, and to overcome the drawbacks inherent in the existing art.

An object of the present disclosure is to provide an inflatable lamp. The inflatable lamp includes a flexible housing and a light strip, the flexible housing defines a receiving cavity, the receiving cavity is inflatable; the light strip is received in the receiving cavity, at least a portion of the light strip is flexible and attached on an inner side of the flexible housing.

In at least one embodiment, the flexible housing includes a substantially transparent or translucent surface, and a light-emitting surface of the at least a portion of the light strip is configured to face towards the substantially transparent or translucent surface.

In at least one embodiment, the inflatable lamp includes a sealing assembly, wherein the sealing assembly is configured to airtightly seal and cover at least a part of the light strip.

In at least one embodiment, the inflatable lamp includes a power supply assembly, wherein the power supply assembly is arranged on the flexible housing and electrically connected with the light strip.

In at least one embodiment, the inflatable lamp includes a sealing assembly, wherein the sealing assembly is configured to airtightly seal and cover the power supply assembly.

In at least one embodiment, the inflatable lamp includes a sealing assembly, wherein the sealing assembly includes a first sealing part and a second sealing part connected with the first sealing part, the first sealing part is configured to airtightly seal the power supply assembly between the inner side of the flexible housing and the first sealing part; the second sealing part is configured to airtightly seal the light strip between the inner side of the flexible housing and the second sealing part.

In at least one embodiment, the power supply assembly includes a mounting element and a power supply, the mounting element is arranged on the inner side of the flexible housing; and the power supply is received in the mounting element, and the light strip is electrically connected with the power supply.

In at least one embodiment, the sealing assembly is configured to airtightly seal and cover the light strip and the mounting element.

In at least one embodiment, the flexible housing defines a mounting hole, the mounting element is arranged on a portion of the flexible housing corresponded to the mounting hole, and received in the receiving cavity; the sealing assembly further includes a sealing element, the sealing element is sealingly connected with the flexible housing, and configured to airtightly seal and cover the mounting element and the power supply.

In at least one embodiment, the mounting element is at least partially transparent.

In at least one embodiment, the power supply assembly includes a battery and/or a solar panel.

In at least one embodiment, the inflatable lamp further includes at least one hanger arranged on an outer surface of the flexible housing.

In at least one embodiment, the inflatable lamp further includes at least one hanger arranged on an outer surface of the flexible housing.

In at least one embodiment, wherein the flexible housing defines at least one vent hole, and the inflatable lamp further includes at least one sealing plug configured to open or airtightly seal the through hole.

An object of the present disclosure is to provide an inflatable lamp; the inflatable lamp includes a flexible housing and a light strip, wherein the flexible housing defines a receiving cavity, the receiving cavity is inflatable, the flexible housing includes a first surface and a second surface connected to the first surface, the second surface is substantially transparent or translucent surface; the light strip is received in the receiving cavity, at least a portion of the light strip is flexible and attached on the first surface, and a light-emitting surface of the at least a portion of the light strip is configured to face towards the second surface.

In at least one embodiment, a sealing assembly, wherein the sealing assembly is configured to airtightly seal and cover at least a part of the light strip.

In at least one embodiment, a sealing assembly, wherein the sealing assembly is configured to airtightly seal and cover at least a part of the light strip.

In at least one embodiment, a sealing assembly, wherein the sealing assembly includes a first sealing part and a second sealing part is connected with the first sealing part, the first sealing part is configured to airtightly seal the power supply assembly between the first surface and the first sealing part; the second sealing part is configured to airtightly seal the light strip between the first surface and the second sealing part.

In at least one embodiment, the power supply assembly includes a mounting element and a power supply, the mounting element is arranged on the first surface; the power supply is received in the mounting element, and the light strip is electrically connected with the power supply.

In the technical solution of the present disclosure, the inflatable lamp includes a flexible housing and a light strip, the flexible housing defines a receiving cavity, the receiving cavity is inflatable; the light strip is received in the receiving cavity, at least a portion of the light strip is flexible and attached on an inner side of the flexible housing. In this way, the light strip, are protected from being damaged, and the air in the receiving cavity may also be prevented from leaking. When in use, the air is filled into the receiving cavity to inflate the inflatable lamp. In an inflated state, the inflatable lamp may float on the water surface and emit light on the water surface; the light emitted by lamp beads of the light strip may be refracted and/or reflected in the receiving cavity, as such the inflatable lamp may generate a light which is soft, transparent, mellow, and uniform, to get a better lighting effect. Since the flexible housing, and the light strip are all flexible, the inflatable lamp may be folded or rolled for carry or store. User may adjust an inflating volume as needed to comfortably wear or use the inflatable light. In addition, the power supply assembly is electrically connected to the light strip to provide electricity for the light strip, so that the inflatable lamp does not need an external power supply, which is convenient for use.

BRIEF DESCRIPTION OF THE DRAWINGS

In order to more clearly illustrate the embodiments of the present disclosure or the technical solutions in the related art, the drawings to be used in the embodiments or description of the related art will be briefly described below. Obviously, the drawings in the following description are only certain embodiments of the present disclosure, and other drawings may be obtained according to the structures shown in the drawings without any creative work for a person having ordinary skill in the art.

DETAILED DESCRIPTION OF THE DISCLOSURE

Figure 1:
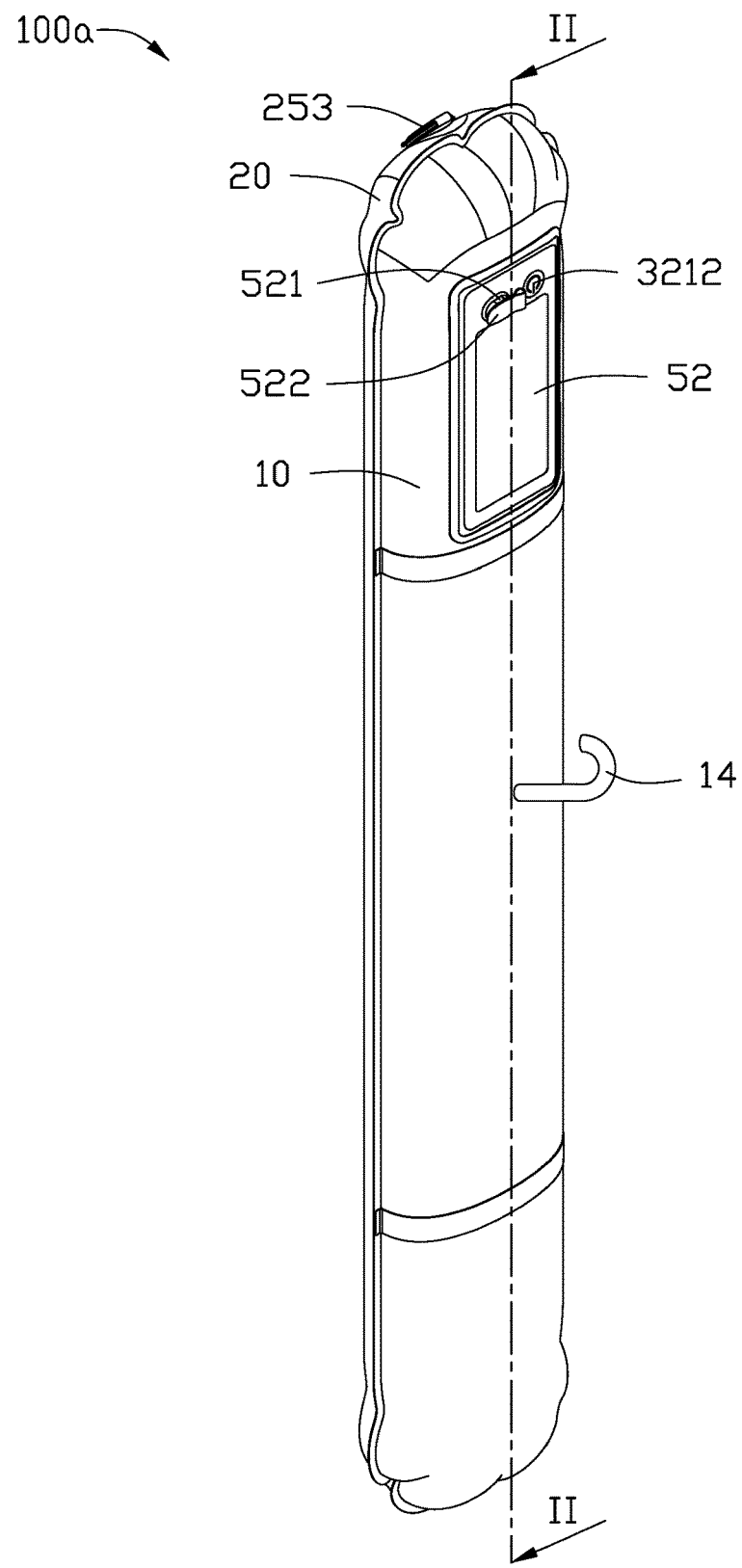
FIG. 1 is a structural schematic view of an inflatable lamp according to a first embodiment of the present disclosure.

The exemplary embodiments described herein detail for illustrative purposes are subject to many variations in implementation. The present disclosure provides a valve core assembly. It should be emphasized, however, that the present disclosure is not limited only to what is disclosed and extends to cover various alternation to valve core assembly. It is understood that various omissions and substitutions of equivalents are contemplated as circumstances may suggest or render expedient, but these are intended to cover the application or implementation without departing from the spirit or scope of the present disclosure.

It should be noted that all directional indications (such as up, down, left, right, front, rear, . . . ) in the embodiments of the present disclosure are only used to explain the relative position relationship, the movement, etc. between the components in a specific posture (as shown in the attached drawings). If the specific posture is changed, the directional indication will be changed accordingly.

In addition, the descriptions of "first", "second", etc., in this application are used for descriptive purposes only, and are not to be construed as indicating or implying their relative importance or implicitly indicating the number of technical features indicated. Thus, features defining "first" or "second" may include at least one of the features, either explicitly or implicitly. In addition, the technical solutions between the various embodiments of the present disclosure may be combined with each other, but must be based on the realization of a person having ordinary skill in the art, when the combination of technical solutions is contradictory or unrealizable, it shall be deemed that such combination of technical solutions does not exist and is not within the scope of this application.

Referring to FIGS. 1 to 11, the present disclosure provides an inflatable lamp 100a according to a first embodiment.

The inflatable lamp 100a includes: a first flexible housing 10, a second flexible housing 20, a power assembly 30 arranged on the first flexible housing 10, a lamp strip 40, and a sealing assembly 50. The second flexible housing 20 is connected with the first flexible housing 10 to cooperatively form a receiving cavity 12. The power assembly 30 includes a mounting element 31 arranged on the first flexible housing 10, and a power supply 32 mounted in the mounting element 31. The lamp strip 40 is received in the receiving cavity 12. One end of the lamp strip 40 is arranged on the mounting element 31 and electrically connected with the power supply 32. The sealing assembly 50 includes a first sealing element 51 sealingly connected with an inner side of the first flexible housing 10, the first sealing element 51 is configured to airtightly seal and cover the lamp strip 40, the mounting element 31, and the power supply 32.

In at least one embodiment, the first flexible housing 10 is sealed with the second flexible housing 20. In detail, a peripheral of the first flexible housing 10 is sealed with a peripheral of the second flexible housing 20.

In at least one embodiment, the light strip 40 is an LED flexible light strip, and the flexible light strip 40 may be bent or even curled.

It should be understood that the first flexible housing 10, the second flexible housing 20, and the light strip 40 may all be bent, and the inflatable lamp 100a in a deflated state may be rolled up for storage and carriage.

In at least one embodiment, the light strip 40 includes a plurality of lamp beads (not labeled) connected in series, and the lamp beads may emit white light or color light. The lamp beads may be LED chips.

It should be understood that the inflatable lamp 100a may be installed on tents, carriages, etc., and the inflatable lamp 100a may also be fixed to surfaces of other objects (such as, backpacks, sunshades, clothes, or inflatable toys, etc.). Since the inflatable lamp 100a may be rolled up, the inflatable lamp 100a may still fit well on the uneven surfaces of the objects.

In at least one embodiment, the first flexible housing 10 has a first cavity 11, and the second flexible housing 20 has a second cavity 21. After the first flexible housing 10 are sealed with the second flexible housing 20, the first cavity 11 and the second cavity 21 cooperatively form the receiving cavity 12.

In at least one embodiment, the first flexible housing 10 and the second flexible housing 20 are matched in shape, and the peripheral of the first flexible housing 10 is sealed with the peripheral of the second flexible housing 20. So that, the inflatable lamp 100*a* is waterproof.

In at least one embodiment, the first flexible housing 10 and/or the second flexible housing 20 has a sucking cup, hook and loop fasteners, a buckle structure (including a buckle head and a buckle seat), or a hook, etc. The inflatable lamp 100*a* may be worn on the human body, attached to the surface of the object, or hung on the object.

In at least one embodiment, the first flexible housing 10 and the second flexible housing 20 are both made of transparent or translucent materials, such as thermoplastic polyurethane (TPU), polyvinyl chloride (PVC), and so on. The first flexible housing 10 may be sealed with the second flexible housing 20 by heat pressing, hot electric pressing, or welding.

In at least one embodiment, peripheries of the power supply assembly 30, the first flexible housing 10, and the second flexible housing 20 are all coated with sealant, so as to obtain a sealed receiving cavity 12.

In at least one embodiment, the first sealing element 51 is made of transparent or translucent materials, such as thermoplastic polyurethane (TPU), polyvinyl chloride (PVC), and so on. The first sealing member 51 is configured to protect the light strip 40, the mounting element 31, and the power supply element 32 from damage, and to separate the receiving cavity 12 from the light strip 40, the mounting element 31, and the power supply element 32, so as to prevent an air leakage.

In at least one embodiment, since masses of the first flexible housing 10, the second flexible housing 20, the power supply assembly 30, the light strip 40, and the sealing assembly 50 are all small, the inflatable lamp 100*a* is easy to carry.

The first flexible housing 10, the second flexible housing 20, and the light strip 40 are all elongated, lengths and widths of first flexible housing 10, the second flexible housing 20, and the light strip 40 may be adjusted according to actual needs to obtain a larger illumination area.

In at least one embodiment, the inflatable lamp 100*a* in the deflated state has a length of 60 cm to 100 cm, and a width of 5 cm to 15 cm; the inflatable lamp 100*a* in the inflated state has a length of 60 cm to 100 cm, and a diameter of 7 cm to 17 cm.

In at least one embodiment, the power supply element 32 includes a solar panel 321 and a battery 322, and the solar panel 321 and the battery 322 are received in the mounting element 31. Electrical energy generated by the solar panel 321 may be stored in the battery 322.

In at least one embodiment, the mounting element 31 is made of rigid plastic.

In the technical solution of the present disclosure, the inflatable lamp 100*a* includes a first flexible housing 10, a second flexible housing 20, a power supply assembly 30, a light strip 40, and a sealing assembly 50. The second flexible housing 20 is connected with the first flexible housing 10 to form the receiving cavity 12. The power supply assembly 30 is arranged on the first flexible housing 10. The power supply assembly 30 includes a mounting element 31 and a power supply 32, the mounting element 31 is arranged on the first flexible housing 10, and the power supply 32 is received in the mounting element 31. The light strip 40 is received in the receiving cavity 12, and the end of the light strip 40 is arranged on the mounting element 31 and electrically connected with the power supply 32. The sealing assembly 50 includes a first sealing element 51 sealingly connected to an inner side of the first flexible housing 10, and the first sealing element 51 is configured to airtightly seal and cover the light strip 40, the mounting member 31, and the power supply member 32. Both the power supply assembly 30 and the light strip 40 are received in the receiving cavity 12, and the first sealing member 51 is configured to airtightly seal and cover the power supply assembly 30 and the light strip 40. In this way, the light strip 40, the mounting member 31, and the power supply member 32 are protected from being damaged, and the air in the receiving cavity 12 may also be prevented from leaking.

When in use, the air is filled into the receiving cavity 12 to inflate the inflatable lamp 100*a*. In an inflated state, the inflatable lamp 100*a* may float on the water surface and emit light on the water surface; the light emitted by the lamp beads of the light strip 40 may be refracted and/or reflected in the receiving cavity 12, as such the inflatable lamp 100*a* may generate a light which is soft, transparent, mellow, and uniform, to get a better lighting effect. Since the first flexible housing 10, the second flexible housing 20, and the light strip 40 are all flexible, the inflatable lamp 100*a* may be folded or rolled for carry or store. User may adjust the inflating volume as needed to comfortably wear or use the inflatable light 100*a*. In addition, the power supply 32 of the power supply assembly 30 is electrically connected to the light strip 40 to provide electricity for the light strip 40, so that the inflatable lamp 100*a* does not need an external power supply, which is convenient for use.

The first sealing element 51 includes a first sealing part 511 and a second sealing part 512 connected to the first sealing part 511. The first sealing part 511 is configured to airtightly seal the mounting element 31 and the power supply 32 between the inner side of the first flexible housing 10 and the first sealing part 511, the second sealing part 512 is configured to airtightly seal the light strip 40 between the inner side of the first flexible housing 10 and the second sealing part 512.

In at least one embodiment, the second sealing part 512 is matched with the mounting element 31 in shape.

In at least one embodiment, the second sealing part 512 is matched with the light strip 40 in shape.

In at least one embodiment, the first sealing part 511 is sealed with the second sealing part 512.

In the technical solution of the present disclosure, the first sealing part 511 is configured to airtightly seal the mounting element 31 and the power supply 32 between the inner side of the first flexible housing 10 and the first sealing part 511, the second sealing part 512 is configured to airtightly seal the light strip 40 between the inner side of the first flexible housing 10 and the second sealing part 512. In this way, the first sealing part 511 and the second sealing part 512 can not only protect the light strip 40, the mounting element 31, and the power supply 32 from being damaged, but also prevent the air in the receiving cavity 12 from leaking out.

One end of the light strip 40 is disposed on a surface of the mounting member 31 opposite to the solar panel 321, and electrically connected with the solar panel 321. The mounting element 31 is at least partially transparent.

In at least one embodiment, one end of the mounting element 31 defines a notch 311, and the solar panel 321 is exposed from the notch 311. The end of the light strip 40 is arranged on the surface of the mounting member 31 opposite to the solar panel 321, and electrically connected to the solar panel 321 through the notch 311.

In at least one embodiment, the end of the light strip 40 is arranged on the surface of the mounting element 31 opposite to the solar panel 321, and bent and extended along one end of the mounting element 31, to electrically connect to the solar panel 321.

In at least one embodiment, the light strip 40 is adhered to the surface of the mounting element 31 opposite away the solar power panel 321 by an adhesive.

In the technical solution of the present disclosure, the end of the light strip 40 is disposed on the surface of the mounting member 31 opposite to the solar panel 321, and electrically connected with the solar panel 321, and the mounting element 31 is at least partially transparent. So that, the illumination area of the inflatable lamp 100a is expanded.

The light strip 40 includes a body 41 and a connecting end 42 connected with the body 41. The connecting end 42 of the light strip 40 is arranged on the surface of the mounting element 31 opposite to the solar panel 321 and electrically connected with the solar panel 321.

In at least one embodiment, the connecting end 42 is arranged on the surface of the mounting element 31 opposite to the solar panel 321, and electrically connected with the solar panel 321 through the notch 311.

In at least one embodiment, the connecting end 42 is arranged on the surface of the mounting element 31 opposite to the solar panel 321, and extended and bent along an end of the mounting element 31, until the connecting end 42 is connected with the solar panel 321.

In at least one embodiment, the body 41 and the connecting end 42 both include a plurality of light beads.

The first flexible housing 10 has a mounting hole 13, the mounting element 31 is arranged on a portion of the first flexible housing 10 corresponding to the mounting hole 13, and received in the receiving cavity 12. The sealing assembly 50 further includes a second sealing element 52 facing the first sealing element 51. The second sealing element 52 is configured to sealingly connect with the first flexible housing 10, and airtightly seal and cover the mounting element 31 and the power supply 32.

In at least one embodiment, the second sealing element 52 is made of transparent or translucent materials, such as thermoplastic polyurethane (TPU), polyvinyl chloride (PVC), and so on.

In at least one embodiment, a peripheral of the second sealing element 52 is sealingly connected with a peripheral of the first sealing element 51.

In at least one embodiment, after the first sealing part 511 is sealed with the second sealing part 512, the mounting element 31 and the power supply 32 may be arranged on the first sealing part 511, the light strip 40 may be arranged on the second sealing part 512, and the second sealing element 52 may be placed on the inner side of the first flexible housing 10. Then the first sealing element 51 and the second sealing element 52 are subjected to a sealing process such as heat pressing, hot electric pressing, or welding. In this way, the peripheral of the first sealing element 51 is sealed with the peripheral of the second sealing element 52, and the second sealing element 52 is sealed with a peripheral of the mounting hole 13.

In at least one embodiment, after the first sealing part 511 is sealed with the second sealing part 512, the mounting element 31 and the power supply 32 may be arranged on the first sealing part 511, the light strip 40 may be arranged on the second sealing part 512, and the second sealing element 52 may be placed on an outer side of the first flexible housing 10. Then the first sealing element 51 and the second sealing element 52 are subjected to the sealing process. In this way, the peripheral of the first sealing element 51 is sealed with the inner side of the first flexible housing 10, and the peripheral of the second sealing element 52 is sealed with the outer side of the first flexible housing 10.

In at least one embodiment, when the first sealing element 51 is sealed with the second sealing element 52, a connecting area 5111 of the first sealing part 511 and the second sealing part 512 is not subjected to the sealing process, so as to prevent the light strip 40 in the connecting area 5111 from being damaged.

In at least one embodiment, when the second sealing part 512 is sealed with the second sealing part 512, a connecting edge 5121 is formed on the inner side of the first flexible housing 10.

In at least one embodiment, the first sealing element 51, the second sealing element 52, and the inner side of the first flexible housing 10 cooperatively form an accommodating cavity 15, and the mounting element 31, the power supply 32, and the light strip 40 are accommodated in the accommodating cavity 15.

In at least one embodiment, the first sealing part 511 and/or the second sealing part 512 defines at least one through hole, the through hole is configured to communicate the accommodating cavity 15 with the receiving cavity 12.

In at least one embodiment, at least a part of a light receiving surface of the solar panel 321 is exposed from the mounting hole 13, so that the solar panel 321 can absorb light.

In at least one embodiment, the second sealing element 52 is received in the mounting hole 13 or covers the mounting hole 13, to airtightly seal and cover the power supply 32 and the mounting element 31.

The mounting element 31 has a receiving groove, and both the solar panel 321 and the battery 322 are received in the receiving groove.

In at least one embodiment, the mounting element 31 defines a first receiving groove 312, and the battery 322 is received in the first receiving groove 312. The mounting element 31 further defines a second receiving groove 313 communicated with the first receiving groove 312. The second receiving groove 313 is formed by recessing two opposite side walls of the first receiving groove 312 in the opposite directions. The solar panel 321 is received in the second receiving groove 313.

In at least one embodiment, the first sealing part 511 defines a first accommodating groove 5112 and a second accommodating groove 5113 communicated with the first accommodating groove 5112. The second accommodating groove 5113 is formed by recessing two opposite side walls of the first accommodating groove 5112 in opposite directions. Walls of the first receiving groove 312 are accommodated in the first accommodating groove 5112, and walls of the second receiving groove 313 are accommodated in the second accommodating groove 5113.

In at least one embodiment, a surface of the mounting element 31 away from the first sealing element 51 defines the first receiving groove 312 and the second receiving groove 313.

The inflatable lamp 100a further includes at least one magnetic mounting component 16 mounted on the inner side of the first flexible housing 10 or the inner side of the second flexible housing 20.

In at least one embodiment, the inflatable lamp 100a further includes at least one magnetic mounting component 16 and at least one coating film 17 configured to seal the at least one magnetic mounting component 16. The at least one coating film 17 is configured to seal the at least one magnetic mounting component 16 on the inner side of the first flexible housing 10 or the inner side of the second flexible housing 20. The at least one magnetic mounting component 16 may absorb a metal piece (not shown), for fixing the inflatable lamp 100a on the metal piece.

Preferably, the at least one magnetic mounting component 16 includes at least two magnetic mounting components 16, the at least two magnetic mounting components 16 are arranged at intervals along an extension direction of the light strip 40 and between the light strip 40 and the first flexible housing 10.

Figure 2:
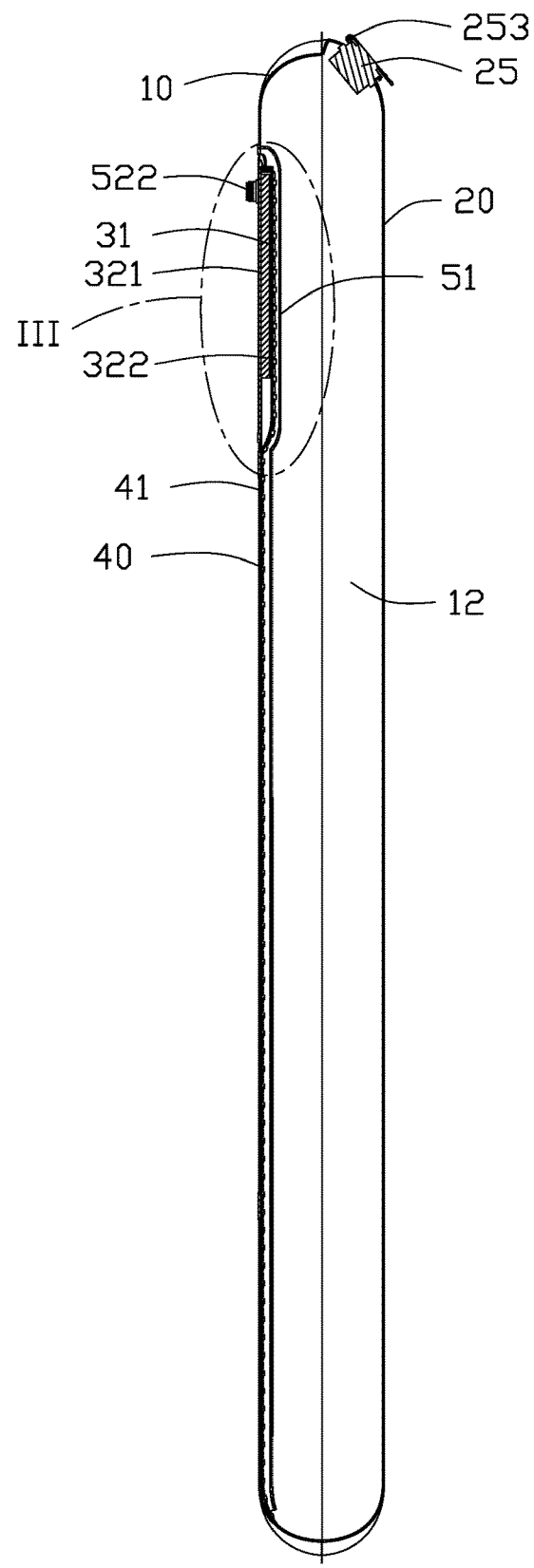
FIG. 2 is a cross-sectional view of the inflatable lamp of FIG. 1 along II-II line.
Figure 3:
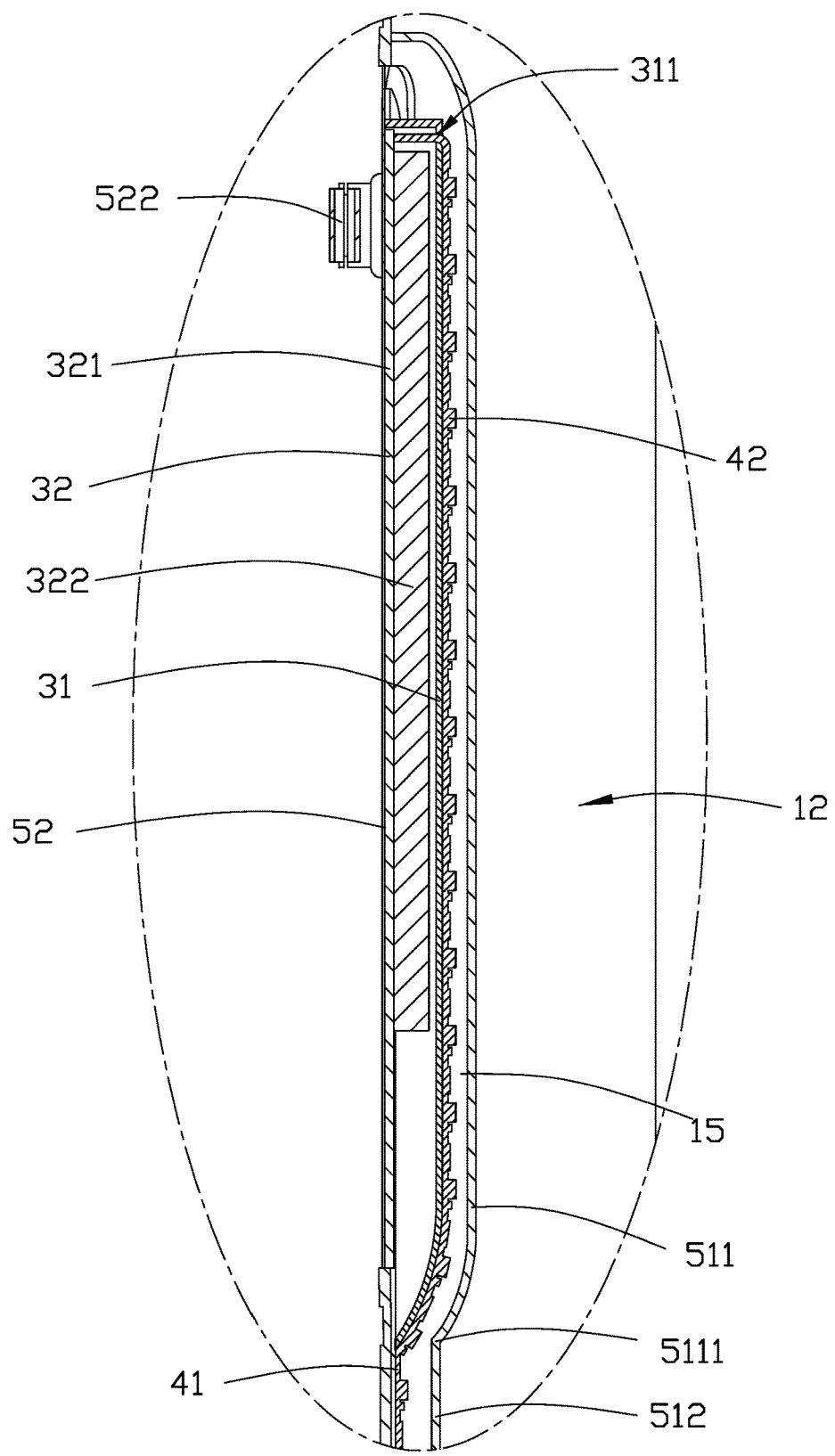
FIG. 3 is an enlarged view of a portion III in FIG. 2.
Figure 4:
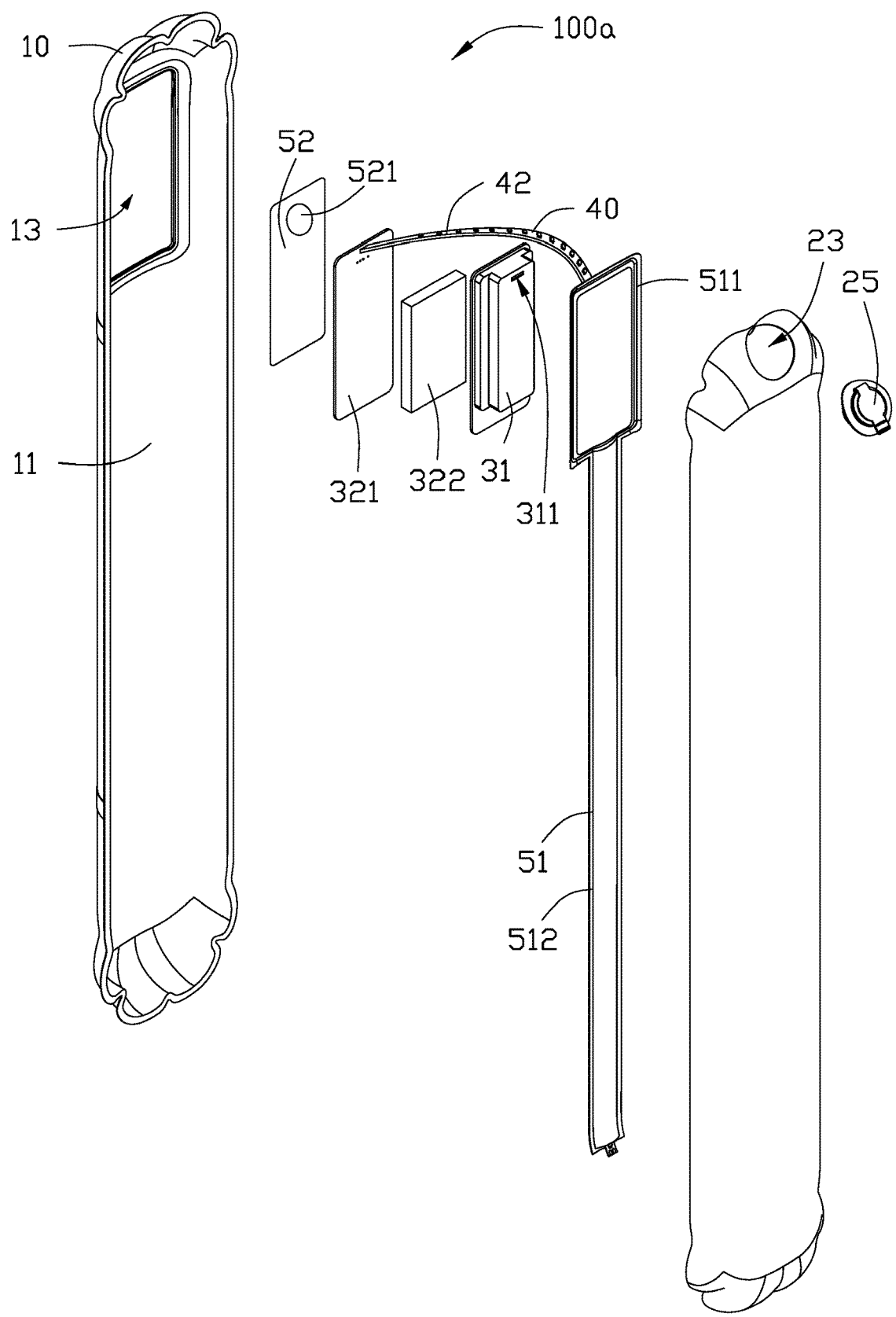
FIG. 4 is an exploded view of the inflatable lamp of FIG. 1.

Referring to FIGS. 2 to 3, a light-emitting surface of the light strip 40 is attached on the inner side of the first flexible housing 10.

It should be understood that the first flexible housing 10 is made of transparent or translucent materials, such as TPU or PVC. So that, the light from the light strip 40 may be emitted from the first flexible housing 10.

Referring to FIGS. 1 to 5, the first flexible housing 10 and/or the second flexible housing 20 defines at least one vent hole 23, the inflatable lamp 100a further includes at least one sealing plug 25 configured to open or airtightly seal the through hole 23.

In at least one embodiment, the sealing plug 25 has a through hole 251 configured for charging and discharging air.

In at least one embodiment, the sealing plug 25 also includes a cover 253 rotatably connected with a periphery of the through hole 251, to seal the receiving cavity 12.

In at least one embodiment, the sealing plug 25 is a press-type air tap configured to prevent the air in the receiving cavity 12 from leakage.

In the technical solution of the present disclosure, the first flexible housing 10 and/or the second flexible housing 20 defines at least one vent hole 23. The inflatable lamp 100a further includes at least one sealing plug 25 configured to open or airtightly seal the through hole 23, to charge and discharge air.

Figure 5:
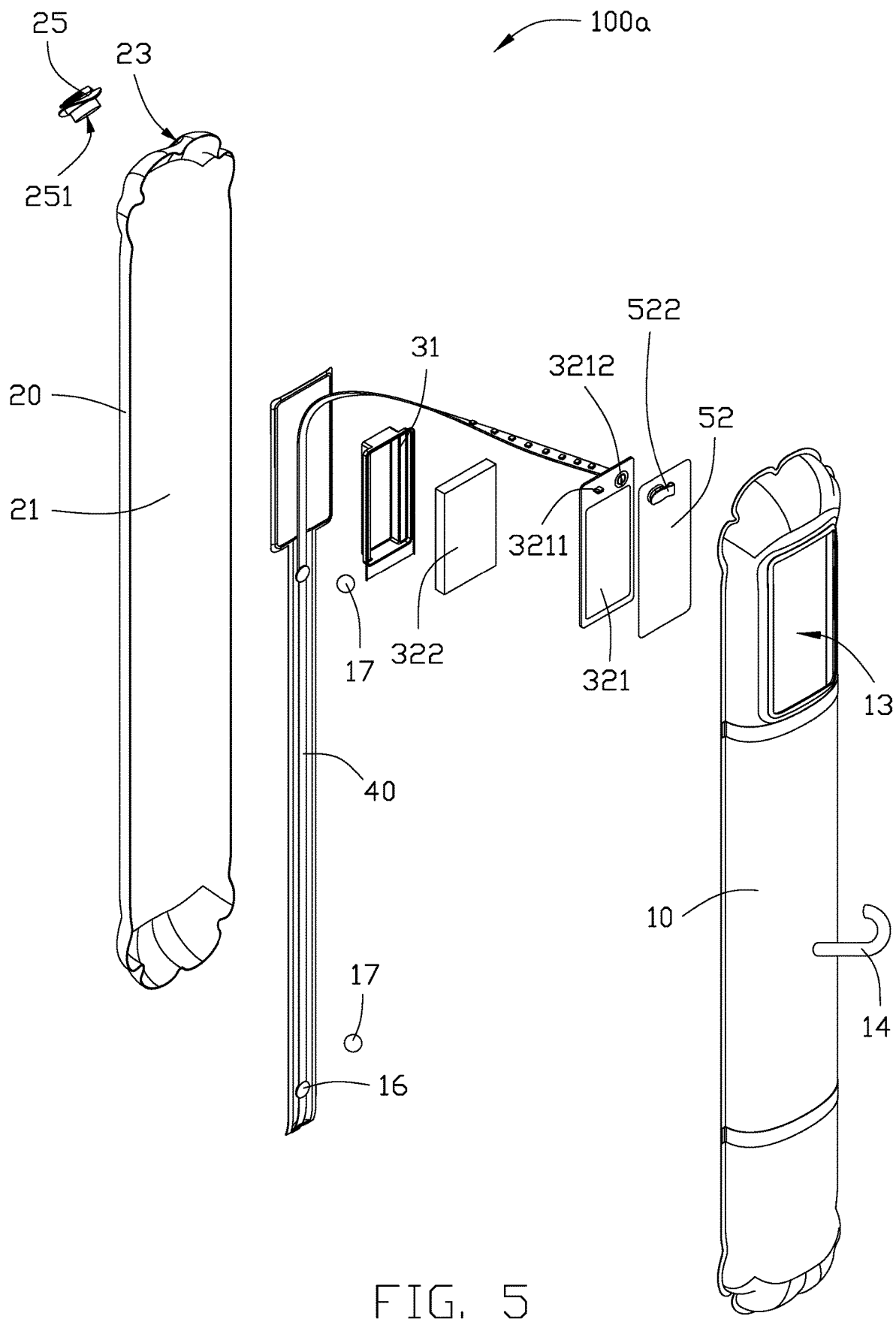
FIG. 5 is similar to FIG. 4, but shown from another view.
Figure 6:
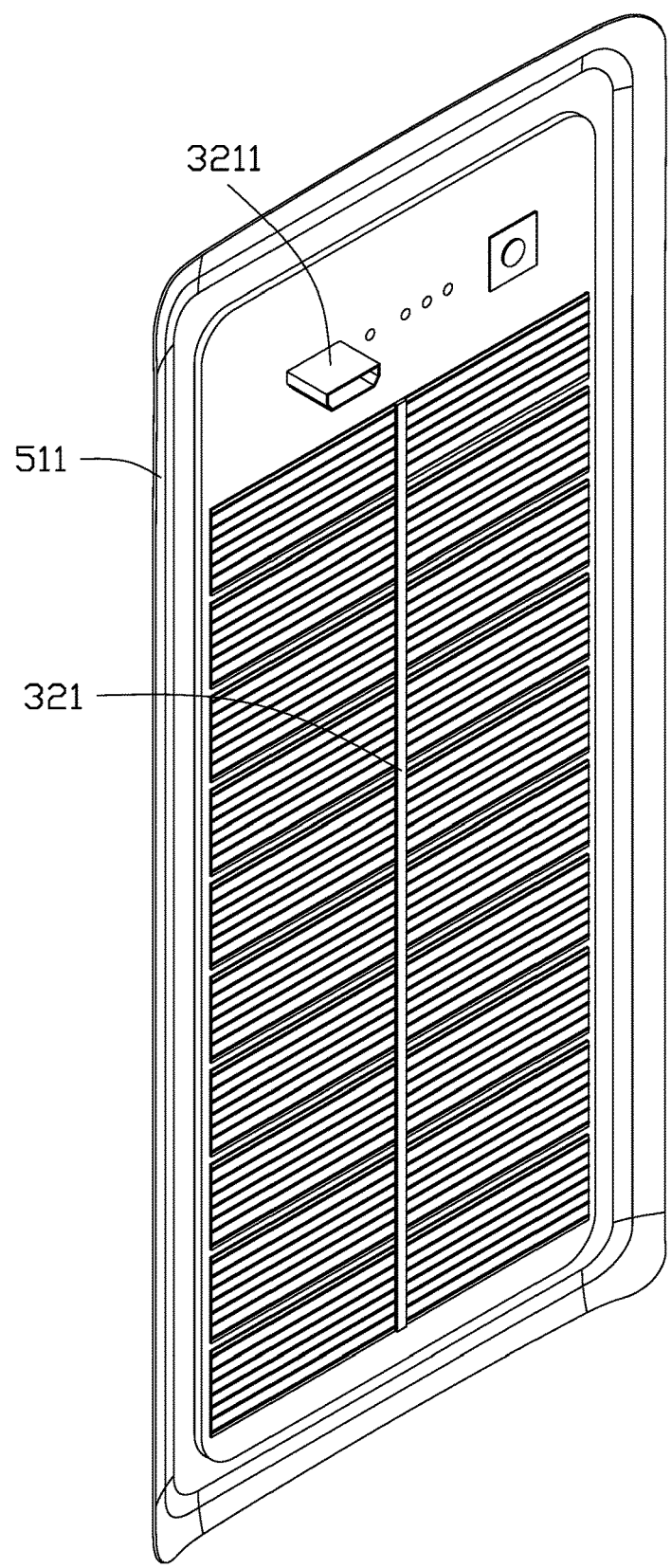
FIG. 6 is a structural schematic view of parts of a power supply assembly of the inflatable lamp of FIG. 1.
Figure 7:
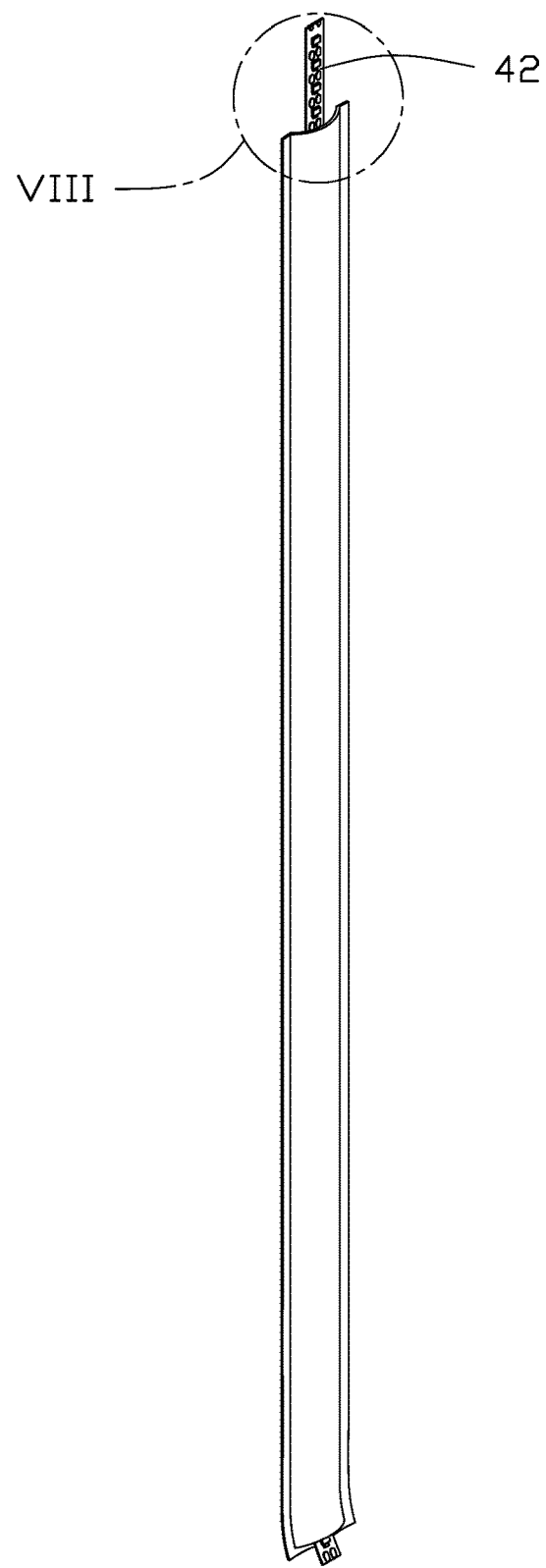
FIG. 7 is a structural schematic view of a light strip and a second sealing part of the inflatable lamp of FIG. 1.
Figure 8:
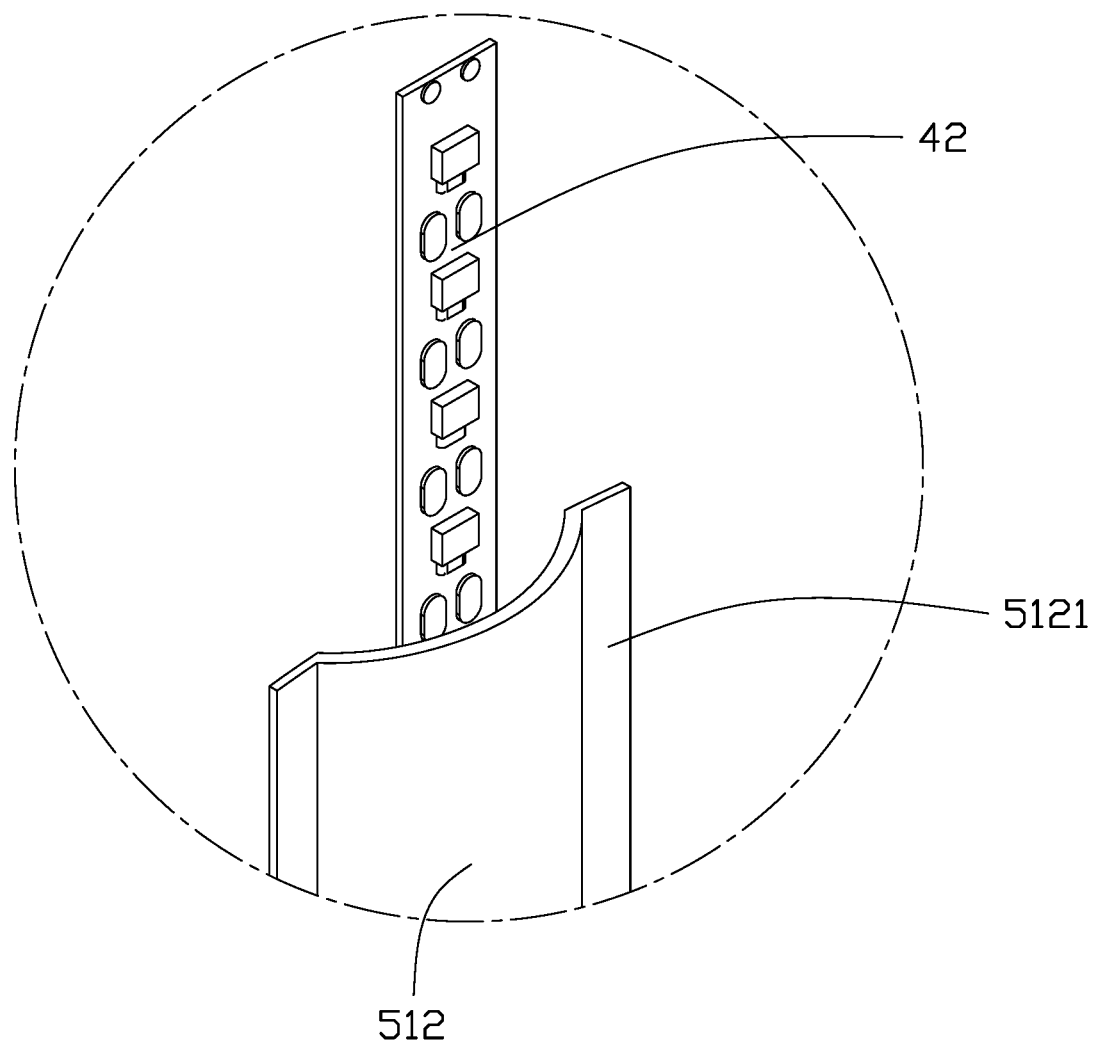
FIG. 8 is an enlarged view of a portion VIII in FIG. 7.
Figure 9:
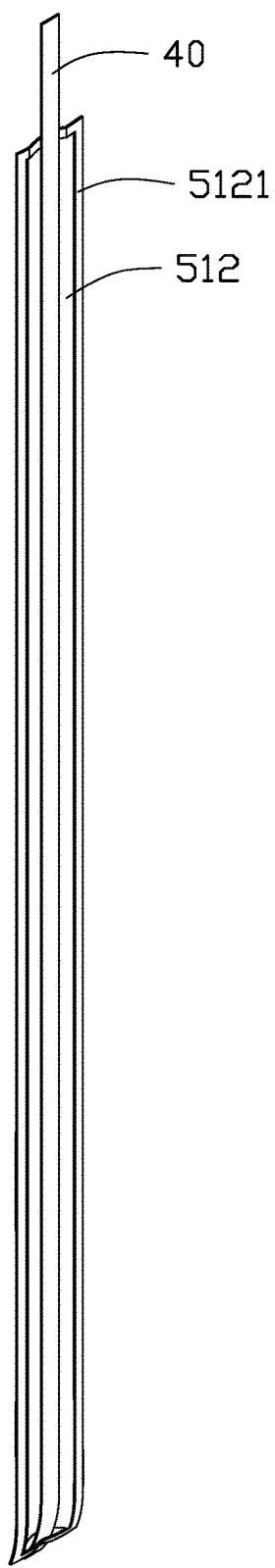
FIG. 9 is similar to FIG. 7, but shown from another view.
Figure 10:
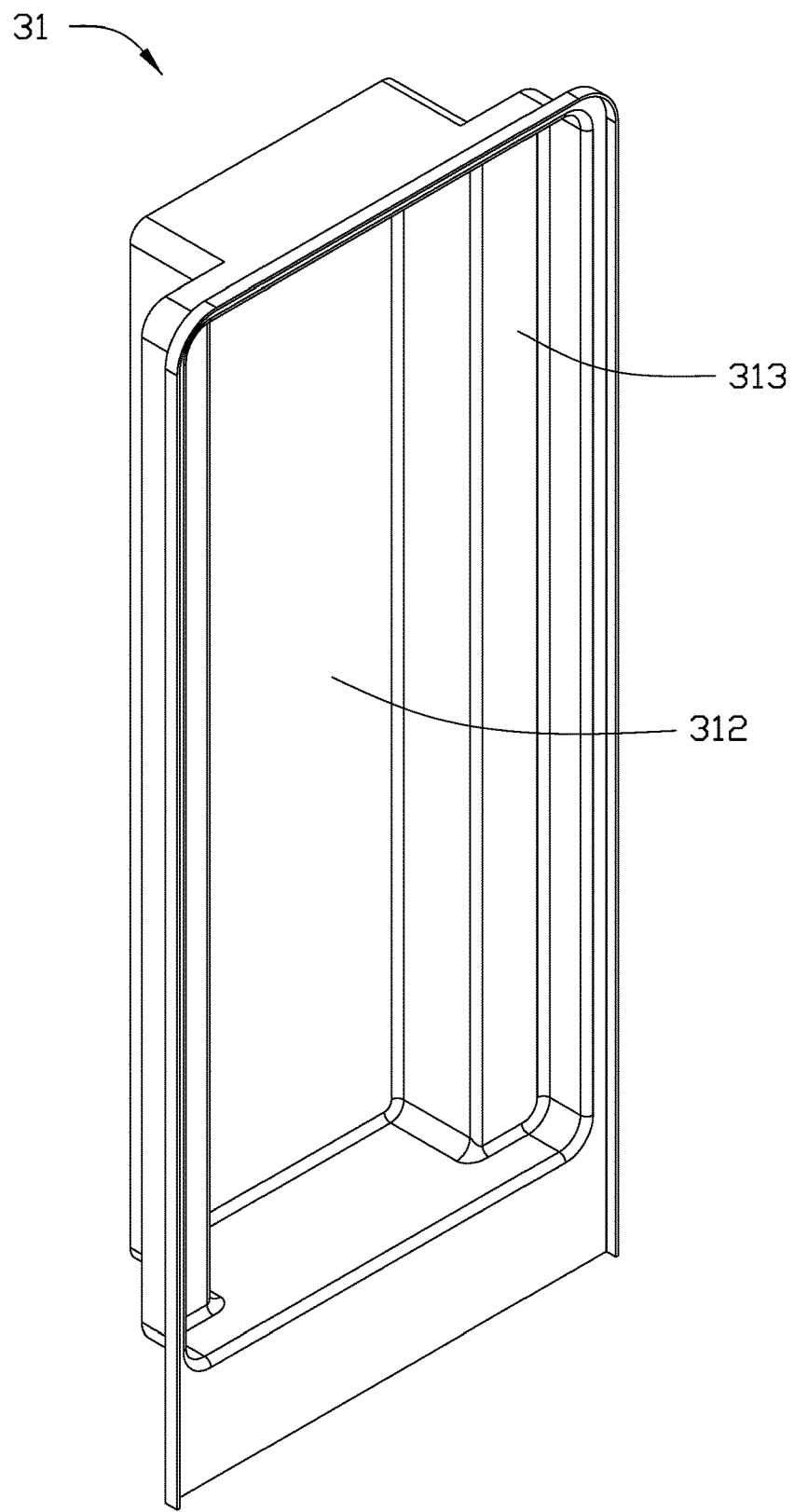
FIG. 10 is a structural schematic view of a mounting element of the inflatable lamp of FIG. 1.
Figure 11:
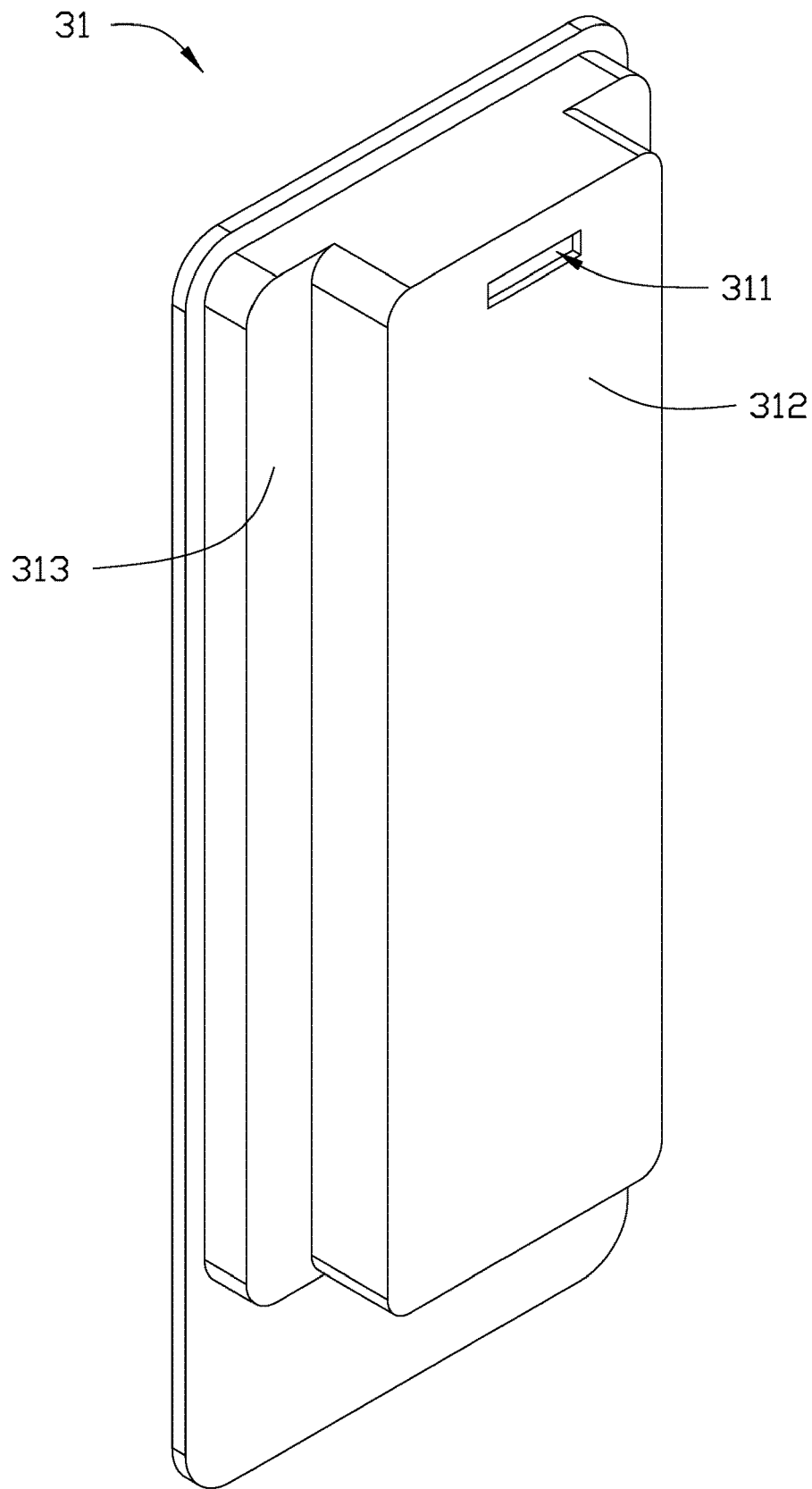
FIG. 11 is similar to FIG. 10, but shown from another view.

Referring to FIGS. 1 and 5, an outer surface of the first flexible housing 10 or an outer surface of the second flexible housing 20 includes at least one hanger 14.

In at least one embodiment, the outer surface of the first flexible housing 10 or the outer surface of the second flexible housing 20 includes a plurality of hangers 14.

In at least one embodiment, both ends of the first flexible housing 10 or both ends of the second flexible housing 20 include the hangers 14.

In the technical solution of the present disclosure, the outer surface of the first flexible housing 10 or the outer surface of the second flexible housing 20 includes at least one hanger 14, so as to hang the inflatable lamp 100a on a fixed object.

The solar panel 321 includes a USB interface 3211, the second sealing element 52 includes an opening 521, the USB interface 3211 is exposed from the opening 521, and the USB interface 3211 is sealingly connected with a hole wall of the opening 521.

In at least one embodiment, the second sealing element 52 further includes a sealing plug 522, the sealing plug 522 is configured to expose or cover the USB interface 3211.

It should be understood that the USB interface 3211 may be connected with an external power supply, to supply power to the light strip 40. Meanwhile, the solar panel 321 may also be configured to charge terminal devices such as mobile phones through the USB interface 3211.

In at least one embodiment, the solar panel 321 further includes a switch 3212, and the switch 3212 is configured to turn on or turn off the light strip 40.

In at least one embodiment, the solar panel 321 further includes a control circuit (not shown), the control circuit may be wirelessly connected with a mobile terminal through Bluetooth and support a remote control of the mobile terminal. The control circuit board may also be configured to change light modes of the light strip 40.

In at least one embodiment, the solar panel 321 further includes a sound player (not shown) such as a speaker. After the control circuit is connected with a remote terminal through Bluetooth, the sound player may play sound or music.

In at least one embodiment, the light strip 40 may be turned on or turned off by pressing or touching the switch 3212. The light emitting color of the light strip 40 may also be changed by pressing or touching the switch 32121.

Figure 12:
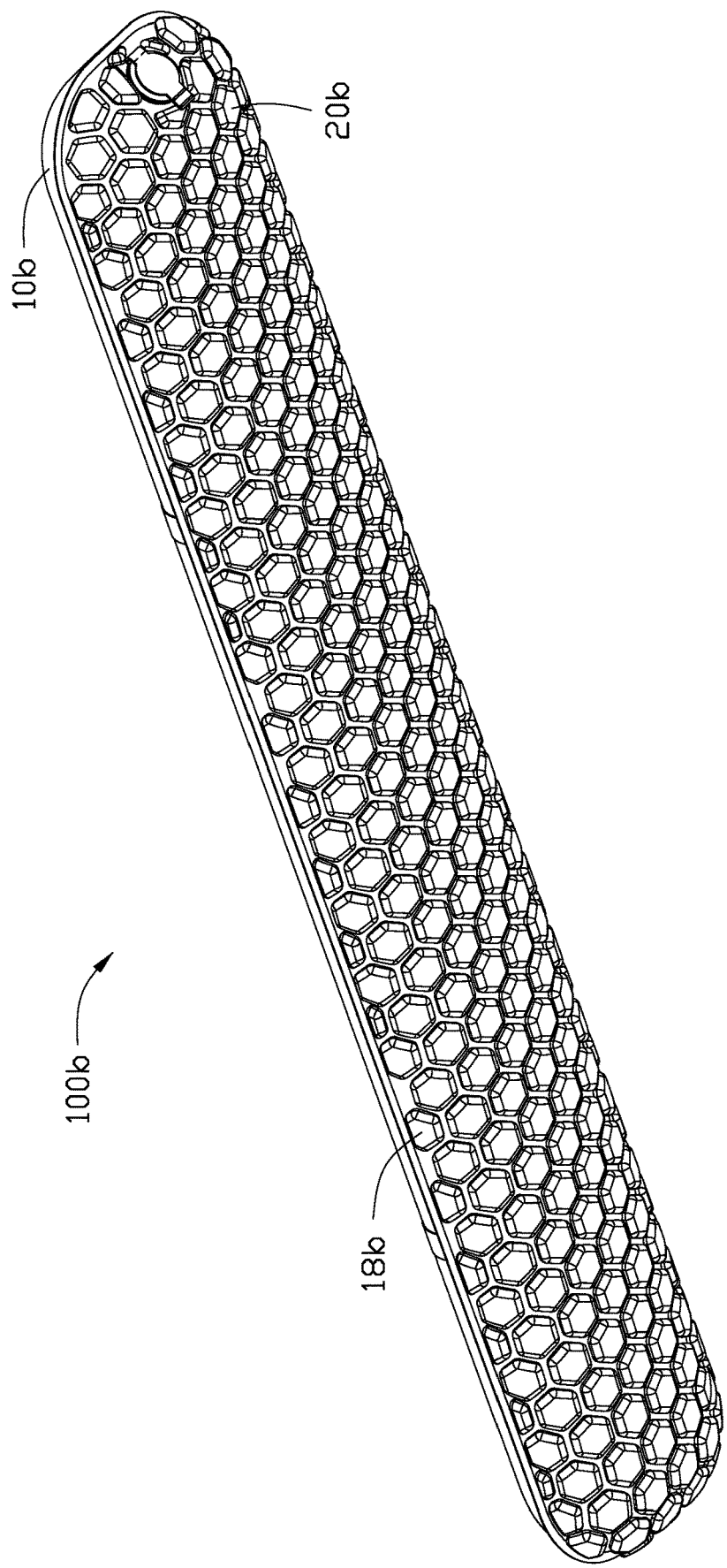
FIG. 12 is a structural schematic view of an inflatable lamp according to a second embodiment of the present disclosure.

Referring to FIG. 12, the present disclosure provides an inflatable lamp 100b according to a second embodiment. The inflatable lamp 100b of the second embodiment is similar in structure to the inflatable lamp 100a of the first embodiment, and the difference between the inflatable lamp 100b of the second embodiment and the inflatable lamp 100a of the first embodiment includes: an outer surface of the first flexible housing 10b and/or an outer surface of the second flexible housing 20b includes at least one light guiding element 18b configured to guide light. The light guiding elements 18b with different structures may be applied on the outer surface of the first flexible housing 10b and/or the outer surface of the second flexible housing 20b according to the scenarios, to condense or diffuse the light, so as to narrow or expand the illumination area.

In at least one embodiment, the light guiding element 18b is flexible.

In at least one embodiment, the light guiding element 18b is pre-filled with air.

In at least one embodiment, each light guiding element 18b defines a vent hole (not shown), the vent holes of the light guiding elements 18b are communicated with the receiving cavity cooperatively defined by the first flexible housing 10b and the second flexible housing 20b. When the air is filled into the receiving cavity, the light guide element 18b is also filled with air to achieve a light guide effect.

In at least one embodiment, the light guide portion 18b has a circle shape, a polygon shape, or an irregular shape, etc.

In at least one embodiment, the outer surface of the first flexible housing 10b and/or the outer surface of the second flexible housing 20b include a plurality of light guiding elements 18b. The light guiding elements 18b are arranged at intervals on the outer surface of the first flexible housing 10b and/or the outer surface of the second flexible housing 20b.

In the technical solutions of the present disclosure, the outer surface of the first flexible housing 10b and/or the outer surface of the second flexible housing 20b include at least one light guiding element 18b. The at least one light guiding element 18b is configured to condense or diffuse light, to narrow or expand the illumination area.

Figure 13:
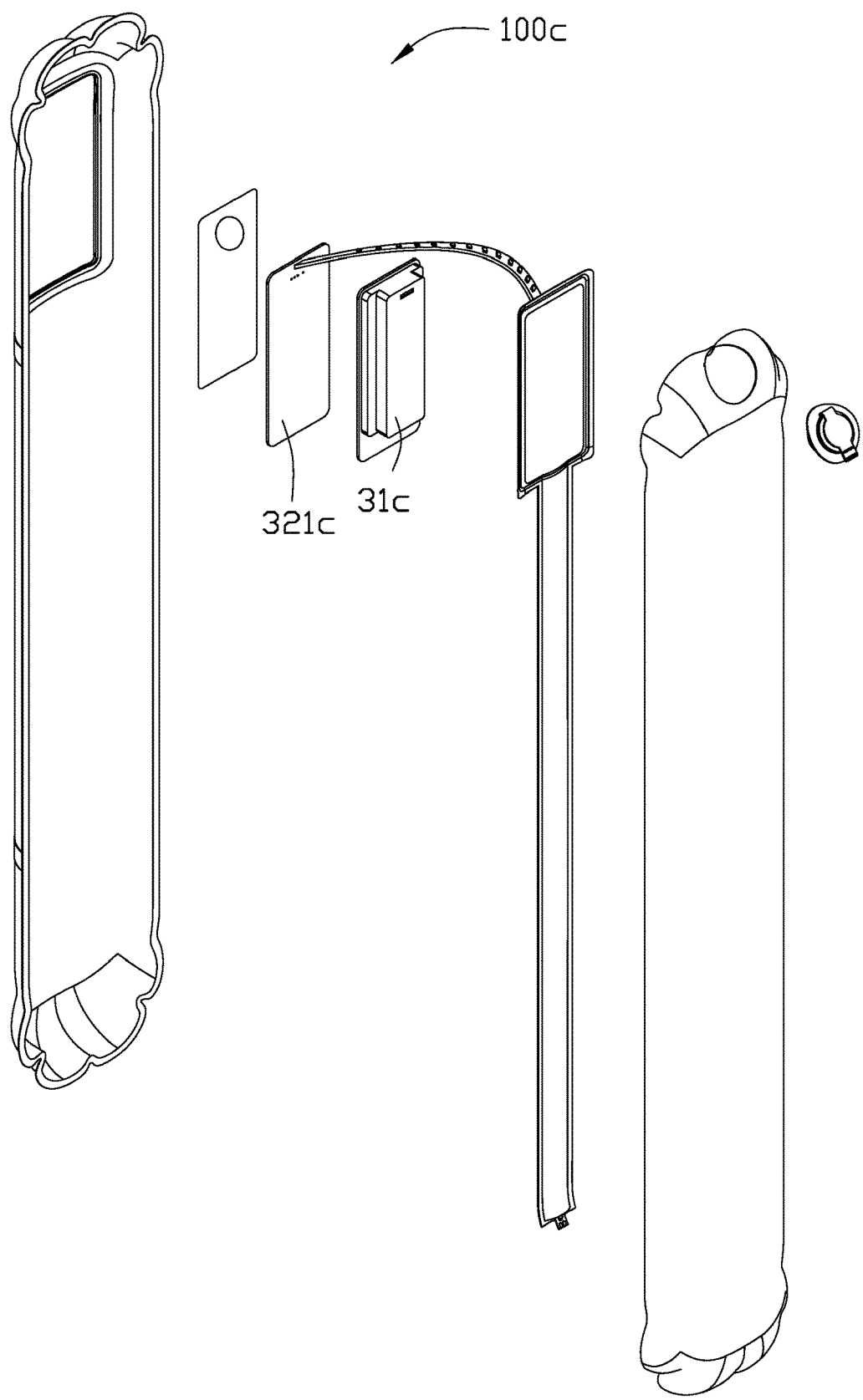
FIG. 13 is a structural schematic view of an inflatable lamp according to a third embodiment of the present disclosure.

Referring to FIG. 13, the present disclosure provides an inflatable lamp 100c according to a third embodiment. The inflatable lamp 100c of the third embodiment is similar in structure to the inflatable lamp 100a of the first embodiment, and the difference between the inflatable lamp 100c of the third embodiment and the inflatable lamp 100a of the first embodiment includes: the power supply includes solar panel 321c received in a mounting element 31c.

Figure 14:
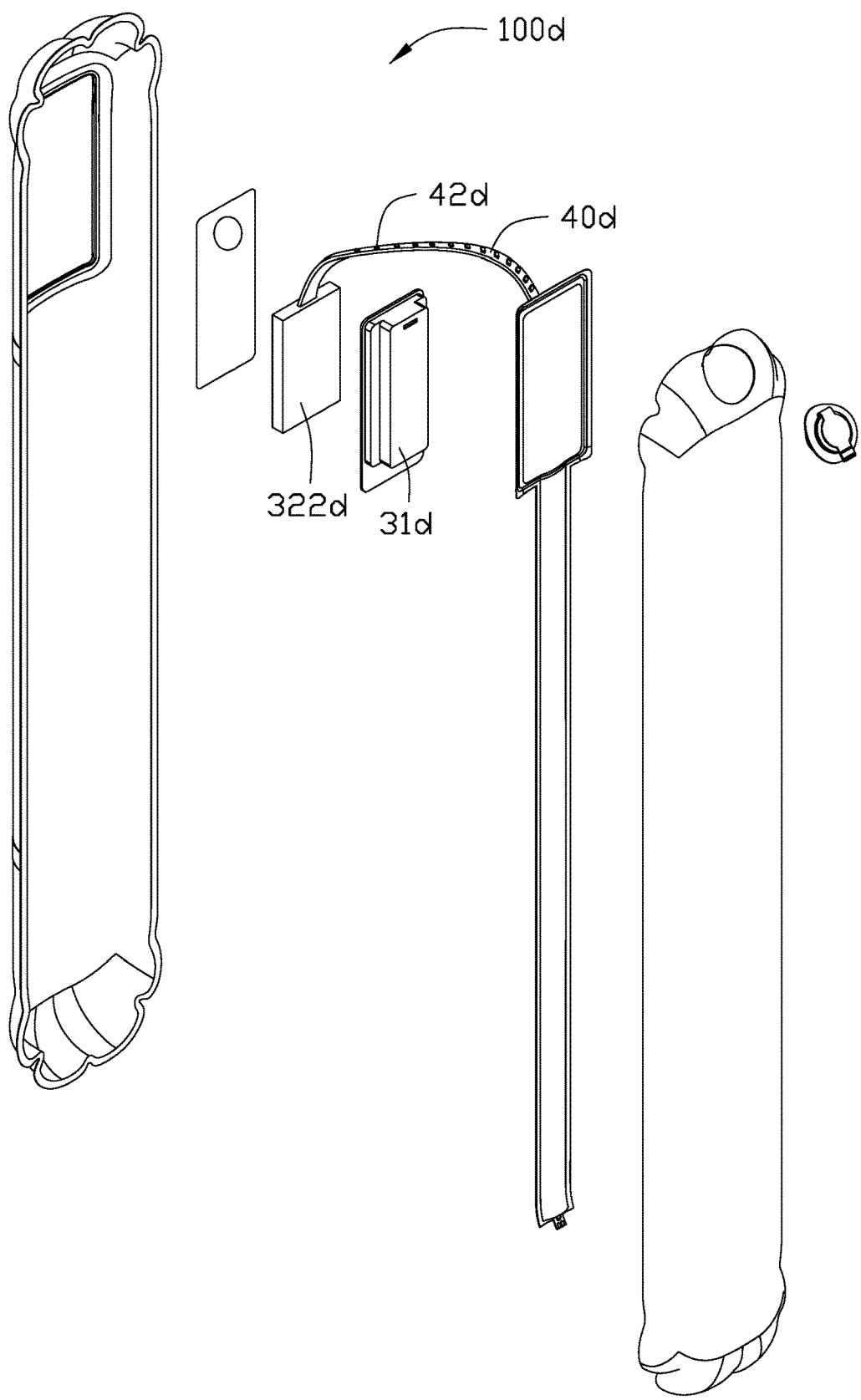
FIG. 14 is a structural schematic view of an inflatable lamp according to a fourth embodiment of the present disclosure.

Referring to FIG. 14, the present disclosure provides an inflatable lamp 100d according to a fourth embodiment. The inflatable lamp 100d of the fourth embodiment is similar in structure to the inflatable lamp 100a of the first embodiment, and the differences between the inflatable lamp 100d of the fourth embodiment and the inflatable lamp 100a of the first embodiment include: the power supply is battery 322d, one end of the light strip 40d is arranged on a surface of a mounting element 31d opposite to the battery 322d, and electrically connected to the battery 322d.

In at least one embodiment, the battery 322d is a rechargeable battery.

In at least one embodiment, the mounting element 31d is at least partially transparent.

In at least one embodiment, the light strip 40d includes a connecting end 42d, the connecting end 42d is arranged on the surface of the mounting element 31d opposite to the battery 322d, and electrically connected to the battery 322d.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, and to thereby enable others skilled in the art to best utilize the present disclosure and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present disclosure.

What is claimed is:

1. An inflatable lamp, comprising:
a flexible housing, the flexible housing defines a receiving cavity, the receiving cavity is inflatable, the flexible housing comprises a first surface and a second surface connected to the first surface;
a light strip, received in the receiving cavity, the light strip comprises a plurality of lighting elements and a flexible base, the plurality of lighting elements are connected in series arranged on the flexible base, at least a portion of the flexible base is attached on an inner side of the first surface, and a light-emitting surface of the plurality of lighting elements is configured to face towards the second surface;
a sealing assembly, received in the receiving cavity, wherein the sealing assembly is configured to airtightly seal and cover the plurality of lighting elements and the flexible base, and the sealing assembly is directly connected to the inner side of the first surface.

2. The inflatable lamp of claim 1, wherein the second surface is substantially transparent or translucent.

3. The inflatable lamp of claim 1, further comprising a power supply assembly, wherein the power supply assembly is arranged on the first surface and electrically connected with the plurality of lighting elements and the flexible base.

4. The inflatable lamp of claim 3, wherein the sealing assembly is configured to airtightly seal and cover the power supply assembly.

5. The inflatable lamp of claim 3, wherein the sealing assembly comprises:
a first sealing part, configured to airtightly seal the power supply assembly between the inner side of the first surface and the first sealing part, the first sealing part is directly connected to the inner side of the first surface; and
a second sealing part, connected with the first sealing part, the second sealing part is configured to airtightly seal the plurality of lighting elements and the flexible base between the inner side of the first surface and the second sealing part.

6. The inflatable lamp of claim 5, wherein the power supply assembly comprises:
a mounting element, arranged on the inner side of the first surface; and
a power supply, received in the mounting element, and the plurality of lighting elements and the flexible base are electrically connected with the power supply.

7. The inflatable lamp of claim 6, wherein the sealing assembly is configured to airtightly seal and cover the plurality of lighting elements and the flexible base and the mounting element.

8. The inflatable lamp of claim 6, wherein the flexible housing defines a mounting hole, the mounting element is arranged on a portion of the flexible housing corresponded to the mounting hole, and received in the receiving cavity; the sealing assembly further comprises:
a sealing element facing the sealing assembly, the sealing element is sealingly connected with the first surface, and configured to airtightly seal and cover the mounting element and the power supply, a peripheral of the sealing element is sealed with an outer side of the first surface.

9. The inflatable lamp of claim 6, wherein the mounting element is at least partially transparent.

10. The inflatable lamp of claim 3, wherein the power supply assembly comprises a battery and/or a solar panel.

11. The inflatable lamp of claim 1, wherein the inflatable lamp further comprises at least one hanger arranged on an outer surface of the first surface or an outer surface of the second surface.

12. The inflatable lamp of claim 1, wherein the inflatable lamp further comprises at least one light guiding element arranged on the first surface or an outer surface of the second surface.

13. The inflatable lamp of claim 1, wherein the first surface or an outer surface of the second surface defines at least one vent hole, and the inflatable lamp further comprises at least one sealing plug configured to open or airtightly seal the vent hole.

14. An inflatable lamp, comprising:
a flexible housing, wherein the flexible housing defines a receiving cavity, the receiving cavity is inflatable, the flexible housing comprises a first surface and a second surface connected to the first surface, the second surface is a substantially transparent or translucent surface;
a light strip, attached to and received in the receiving cavity, the light strip comprises a plurality of lighting elements and a flexible base, the plurality of lighting elements are connected in series arranged on the flexible base, at least a portion of the flexible base is attached on the first surface, and a light-emitting surface of the at least a portion of the light strip is configured to face towards the second surface; and
a sealing assembly, received in the receiving cavity, wherein the sealing assembly is configured to airtightly seal and cover the plurality of lighting elements and the flexible base, and the sealing assembly is directly connected to an inner side of the first surface.

15. The inflatable lamp of claim 14, further comprising a power supply assembly, wherein the power supply assembly is arranged on the first surface and electrically connected with the plurality of lighting elements and the flexible base.

16. The inflatable lamp of claim 15, wherein the sealing assembly is configured to airtightly seal and cover the power supply assembly.

17. The inflatable lamp of claim 15, wherein the sealing assembly comprises:
   a first sealing part, configured to airtightly seal the power supply assembly between the first surface and the first sealing part, the first sealing part is directly connected to the inner side of the first surface; and
   a second sealing part, connected with the first sealing part, the second sealing part is configured to airtightly seal the plurality of lighting elements and the flexible base between the inner side of the first surface and the second sealing part.

18. The inflatable lamp of claim 15, wherein the power supply assembly comprises:
   a mounting element, arranged on the first surface; and
   a power supply, received in the mounting element, and the plurality of lighting elements and the flexible base is electrically connected with the power supply.

* * * * *